United States Patent [19]

Ohya et al.

[11] Patent Number: 4,829,030
[45] Date of Patent: May 9, 1989

[54] HIGH FREQUENCY WAVE ABSORBING CERAMICS

[75] Inventors: Nobuyuki Ohya, Nagoya; Toshiki Saburi, Anjo; Toru Yamazaki, Kariya; Taisei Katoh, Aichi, all of Japan

[73] Assignee: Nippondenso Co., Ltd., Kariya, Japan

[21] Appl. No.: 125,711

[22] Filed: Nov. 25, 1987

Related U.S. Application Data

[63] Continuation of Ser. No. 27,072, Mar. 17, 1987, abandoned, Continuation of Ser. No. 813,462, Dec. 24, 1985, abandoned.

[30] Foreign Application Priority Data

Dec. 28, 1984 [JP] Japan ................. 59-280713

[51] Int. Cl.$^4$ .............................. C04B 35/00
[52] U.S. Cl. ................................... 501/134
[58] Field of Search ............................ 501/134

[56] References Cited
FOREIGN PATENT DOCUMENTS 2701411 7/1977 Fed. Rep. of Germany.

Primary Examiner—Mark L. Bell
Attorney, Agent, or Firm—Cushman, Darby & Cushman

[57] ABSTRACT

A high frequency wave absorbing ceramics can be used, for example, as an EMI preventive filter for interrupting high frequency waves intruding into electronic circuits. The high frequency wave absorbing ceramics are composed of a ternary composition comprising from 50 to 80 mol % of lead iron niobate $Pb(Fe_{\frac{1}{2}}Nb_{\frac{1}{2}})O_3$, from 10 to 40 mol % of lead iron tungstate $Pb(Fe_{\frac{2}{3}}W_{\frac{1}{3}})O_3$ and not more than 40 mol % of lead iron tantalate $Pb(Fe_{\frac{1}{2}}Ta_{\frac{1}{2}})O_3$ based on the total 100 mol % of a composition composed of lead iron niobate $Pb(Fe_{\frac{1}{2}}Nb_{\frac{1}{2}})O_3$, lead iron tungstate $Pb(Fe_{\frac{2}{3}}W_{\frac{1}{3}})O_3$ and lead iron tantalate $Pb(Fe_{\frac{1}{2}}Ta_{\frac{1}{2}})O_3$.

6 Claims, 13 Drawing Sheets

HIGH FREQUENCY WAVE ABSORBING CERAMICS

This is a continuation of application Ser. No. 027,072, filed Mar. 17, 1987 which was abandoned upon the filing hereof about which is a continuation of application Ser. No. 813,462, filed Dec. 24, 1985, which was abandoned upon the filing hereof.

BACKGROUND OF THE INVENTION

1. Field of the Invention:

This invention concerns high frequency wave absorbing ceramics for absorbing high frequency electromagnetic waves.

The ceramics according to this invention can be used, for example, as an EMI (electromagnetic interference) preventive filter for interrupting high frequency waves intruding into electronic circuits.

2. The Prior Art:

Heretofore, dielectric materials such as barium titanate or magnetic materials such as ferrite have been used for the EMI preventive filters.

However, these materials involve drawbacks in that the attenuating band width at high frequency region is narrow, the high frequency interrupting effect is poor, etc. These drawbacks are attributable to the low specific dielectric constant at high frequency.

SUMMARY OF THE INVENTION

This invention has been achieved in order to improve the foregoing drawbacks in the materials of the piror art and it is an object of this invention to provide a novel high frequency wave absorbing material having a large specific dielectric constant in a frequency region from 1 to 100 MHz and a large dielectric loss in a frequency range from 100 MHz to 1 GHz, that is, providing a significant high frequency interrupting effect in the frequency range from 1 MHz to 1 GHz.

The high frequency wave absorbing ceramics of the present invention are composed of a ternary composition comprising from 50 to 80 mol % of lead iron niobate $Pb(Fe_{\frac{1}{2}} Nb_{\frac{1}{2}})O_3$, from 10 to 40 mol % of lead iron tungstate $Pb(Fe_{\frac{2}{3}} W_{\frac{1}{3}})O_3$ and not more than 40 mol % of lead iron tantalate $Pb(Fe_{\frac{1}{2}} Ta_{\frac{1}{2}})O_3$ based on the total 100 mol % of a composition composed of lead iron niobate $Pb(Fe_{\frac{1}{2}} Nb_{\frac{1}{2}})O_3$, lead iron tungstate $Pb(Fe_{\frac{2}{3}} W_{\frac{1}{3}})O_3$ and lead iron tantalate $Pb(Fe_{\frac{1}{2}} Ta_{\frac{1}{2}})O_3$.

DETAILED DESCRIPTION OF THE INVENTION

Figure 1:
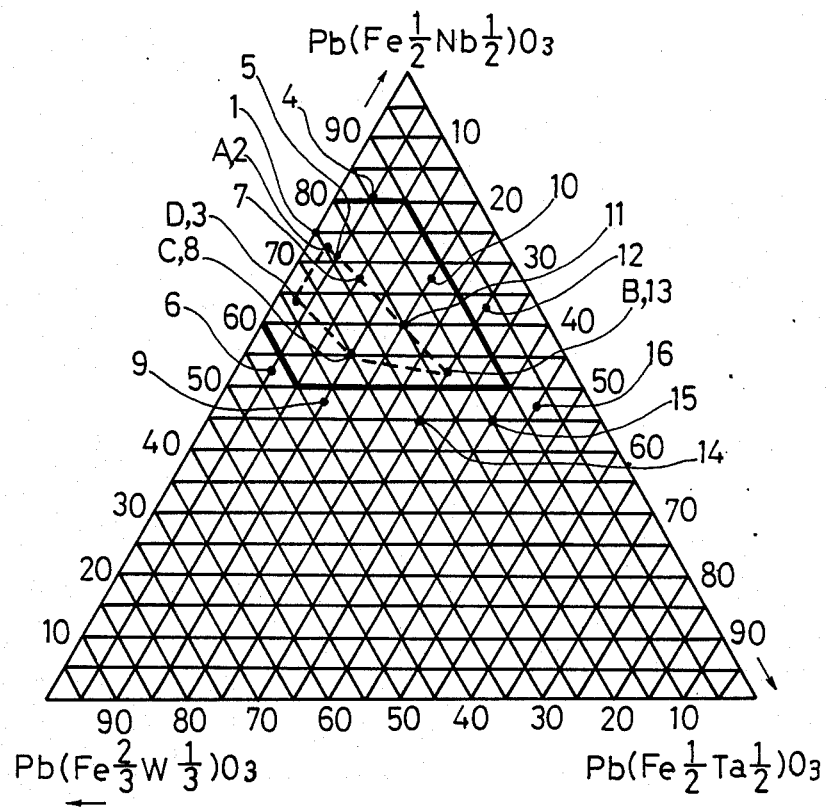
FIG. 1 is a ternary phase diagram showing the range of the composition ratio of the ternary composition according to this invention.

This invention concerns high frequency wave absorbing ceramics of a ternary composition comprising from 50 to 80 mol % of lead iron niobate $Pb(Fe_{\frac{1}{2}} Nb_{\frac{1}{2}})O_3$, from 10 to 40 mol % of lead iron tungstate $Pb(Fe_{\frac{2}{3}} W_{\frac{1}{3}})O_3$ and not more than 40 mol % of lead iron tantalate $Pb(Fe_{\frac{1}{2}} Ta_{\frac{1}{2}})O_3$.

According to this invention, the specific dielectric constant of a binary composition comprising lead iron niobate $(Pb(Fe_{\frac{1}{2}} Nb_{\frac{1}{2}})O_3$ and lead iron tungstate $Pb(Fe_{\frac{2}{3}} W_{\frac{1}{3}})O_3$ is improved by incorporating thereto a further third ingredient.

The ternary composition within the above specified range has a specific dielectric constant of from 10,000 to 17,000 at 1 MHz at the room temperature.

In the case of using the composition according to this invention as the high frequency wave absorbing filter, it is required that the specific dielectric constant at 1 MHz is not less than 8,000 in order to obtain a satisfactory high frequency cut-off property (refer to Japanese Patent Application No. 147,343/1984).

Accordingly, the composition ratio in the material according to this invention is determined such that it has a specific dielectric constant not less than about 10,000 at 1 MHz and thus providing a sufficient high frequency wave absorbing effect.

The composition outside of the above-mentioned range is not suitable as the high frequency wave absorbing material since the specific dielectric constant at 1 MHz is less than 10,000. Particularly, the material withing the range inside the quadrangle ABCD in the ternary phase diagram shown in FIG. 1 has a specific dielectric constant of not less than 13,000 and is more suitable as the high frequency wave absorbing material.

Since the material according to this invention comprises a ternary composition having a high specific dielectric constant within the frequency region of from 1 MHz to 100 MHz, it is excellent in the high frequency wave absorbing effect.

EXAMPLE

This invention will now be described referring to specific example. As the starting material, 4 mol of lead oxide powder (PbO), 1 mol of iron oxide powder ($Fe_2O_3$) and 1 mol of niobium oxide powder ($Nb_2O_5$) were blended, and mixed in a wet manner to thereby obtain a material of lead iron niobate $Pb(Fe_{\frac{1}{2}}Nb_{\frac{1}{2}})O_3$ (hereinafter referred to as "the first ingredient").

Further, 3 mol of lead oxide powder (PbO), 1 mol or iron oxide powder ($Fe_2O_3$) and 1 mol of tungsten oxide powder ($WO_3$) were blended and mixed in a wet manner into a material of lead iron tungstate $Pb(Fe_{\frac{2}{3}}W_{\frac{1}{3}})O_3$ (hereinafter referred to as "the second ingredient").

Furthermore, 4 mol of lead oxide powder (PbO), 1 mol of tantalum oxide powder ($Ta_2O_5$) and 1 mol of iron oxide powder ($Fe_2O_3$) were blended and mixed in a wet manner into a material of lead iron tantalate $Pb(Fe_{\frac{1}{2}}Ta_{\frac{1}{2}})O_3$ (hereinafter referred to as "the third ingredient").

Then, these three types of powder mixtures were respectively kneaded in a wet manner for 24 hours each in a polyethylene jar incorporating with agates, then calcined at about 800° C. for one hour, followed by pulverization to thereby obtain the first ingredient powder, the second ingredient powder and the third ingredient powder respectively.

Then, the first ingredient powder, the second ingredient powder and the third ingredient powder were blended respectively so as to provide the composition ratios : No.1–No.16 shown in Table, and mixed in a wet manner to obtain various powdery specimens. Then, after pelletizing the respective powdery specimens with paraffin and then molding under a pressing pressure of 500 kg into a cylinder sized 10 mm $\phi \times 5$ mm, they were calcined at a temperature from 1,000° to 1,150° C. for one hour. The molding products were baked at the both end faces thereof with silver paste to form electrodes which used for the measurement of the frequency characteristics of the dielectric constant. The frequency characteristics were measured by using a vector impedance analyzer.

For the specimens No.–No.16, the results of the measurement for the specific dielectric constant at 1 MHz under the room temperature are shown in Table.

Figure 2:
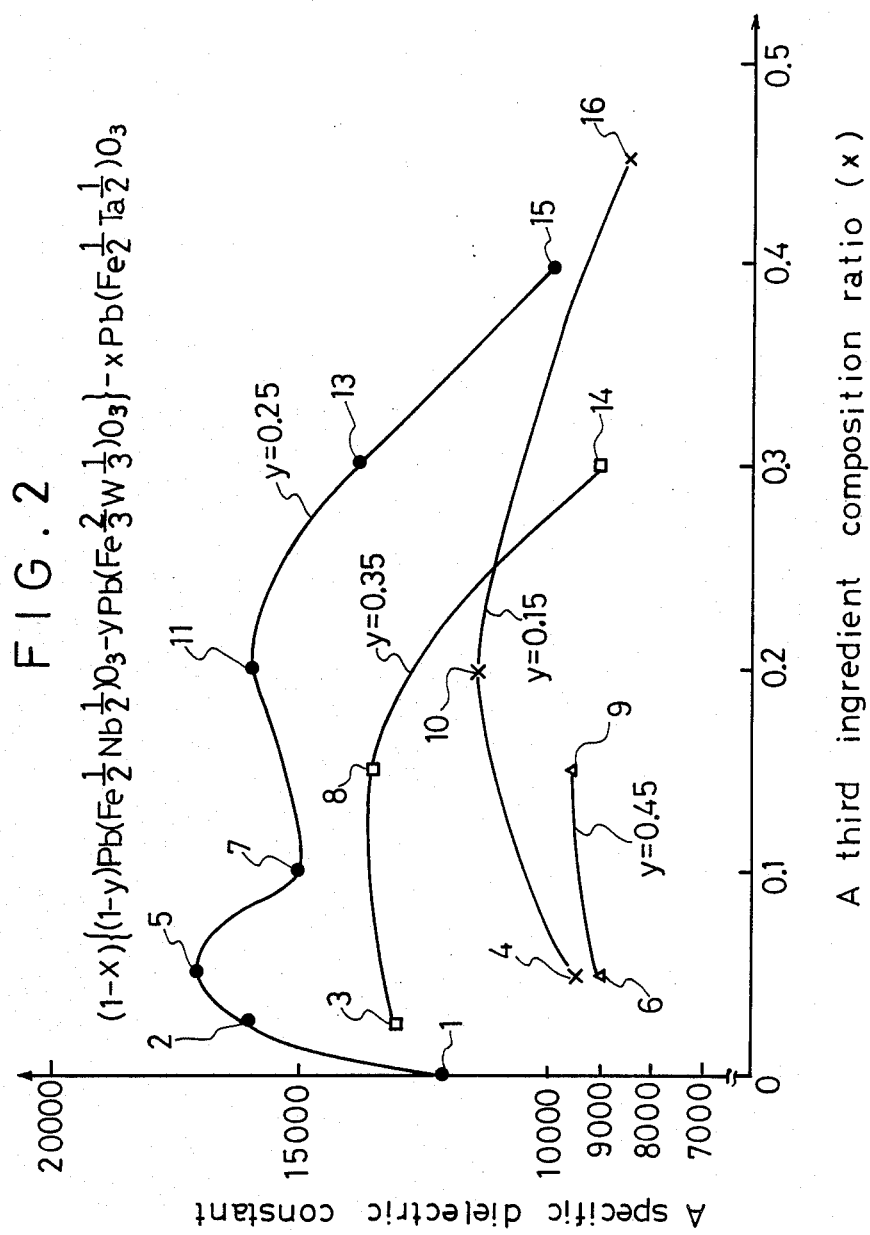
FIG. 2 is a graph showing the characteristics of the specific dielectric constant of the ternary composition relative to the third ingredient composition ratio x, using the binary composition ratio y as a parameter.

FIG. 2 shows the characteristics of the specific dielectric constant of the ternary composition represented as:

$$(1-x)\{(1-y)Pb(Fe_{\frac{1}{2}}Nb_{\frac{1}{2}})O_3 - yPb(Fe_{\frac{2}{3}}W_{\frac{1}{3}})O_3\} - xPb(Fe_{\frac{1}{2}}Ta_{\frac{1}{2}})O_3$$

relative to the third ingredient composition molar ratio x (hereinafter referred to as x) for the ternary system using the composition molar ratio y (hereinafter referred to as y) for the binary system as a parameter.

TABLE

| NO. | Ternary composition (mol %) | | | Specific dielectric constant $\epsilon$ (1 MHz) | x | y |
|---|---|---|---|---|---|---|
| | $Pb(Fe_{\frac{1}{2}}Nb_{\frac{1}{2}})O_3$ | $Pb(Fe_{\frac{2}{3}}W_{\frac{1}{3}})O_3$ | $Pb(Fe_{\frac{1}{2}}Ta_{\frac{1}{2}})O_3$ | | | |
| 1 | 75 | 25 | 0 | 12000 | 0 | 0.25 |
| 2 | 73.125 | 24.375 | 2.5 | 16000 | 0.025 | 0.25 |
| 3 | 63.375 | 34.125 | 2.5 | 13000 | 0.025 | 0.35 |
| 4 | 80.75 | 14.25 | 5 | 9500 | 0.05 | 0.15 |
| 5 | 71.25 | 23.75 | 5 | 17000 | 0.05 | 0.25 |
| 6 | 52.25 | 42.75 | 5 | 9000 | 0.05 | 0.45 |
| 7 | 67.5 | 22.5 | 10 | 15000 | 0.10 | 0.25 |
| 8 | 55.25 | 29.75 | 15 | 13500 | 0.15 | 0.35 |
| 9 | 46.75 | 38.25 | 15 | 9500 | 0.15 | 0.45 |
| 10 | 68 | 12 | 20 | 11500 | 0.20 | 0.15 |
| 11 | 60 | 20 | 20 | 16000 | 0.20 | 0.25 |
| 12 | 63 | 7 | 30 | 9000 | 0.30 | 0.1 |
| 13 | 52.5 | 17.5 | 30 | 14000 | 0.30 | 0.25 |
| 14 | 45.5 | 24.5 | 30 | 9000 | 0.30 | 0.35 |
| 15 | 45 | 15 | 40 | 10000 | 0.40 | 0.25 |
| 16 | 46.75 | 8.25 | 45 | 8500 | 0.45 | 0.15 |

FIGS. 3, 4, 5 and 6 each represent, respectively, those graphs in the case of y=0.25, y=0.35, y=0.15 and y=0.25−0.35 each extracted from the graphs shown in FIG. 2.

Figure 7:
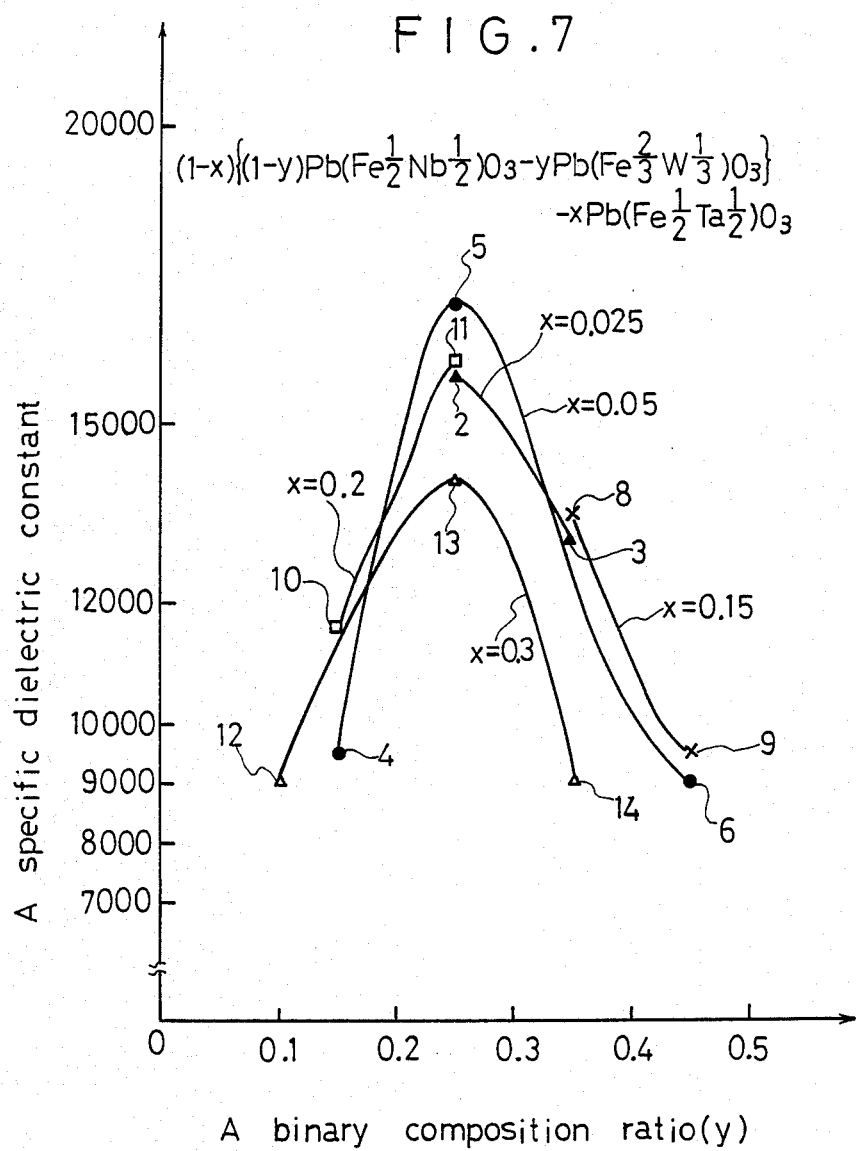
FIG. 7 is a graph showing the characteristics of the specific dielectric constant of the ternary composition relative to the binary composition ratio y, using the ternary composition ratio x as a parameter.

FIG. 7 shows the characteristics of the specific dielectric constant relative to the composition ratio y using the composition ratio x as a parameter.

FIG. 8, 9, 10 and 11 each represent, respectively, those graphs in the cases of x=0.05, x=0.025−0.15−0.2, x=0.3 and x=0.025−0.05−0.15−0.2 each extracted from those shown in FIG. 7.

Figure 12:
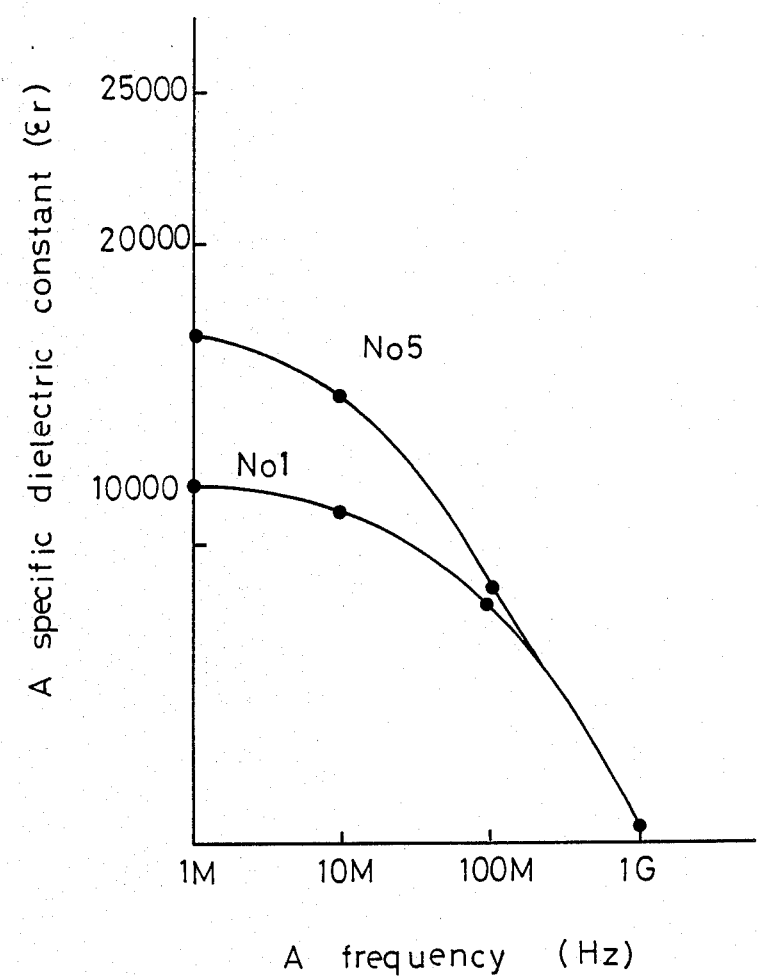
FIG. 12 is a graph showing the frequency characteristics of the specific dielectric constant for the binary composition (No.1) and for the ternary composition (No.5).

FIG. 12 shows the frequency characteristics of the specific dielectric constant for specimens No.1 and No.5.

As can be seen from Table and FIG. 2, relative to the specific dielectric constant of the binary composition : 75 $Pb(Fe_{\frac{1}{2}}Nb_{\frac{1}{2}})O_3$−25 $Pb(Fe_{\frac{2}{3}}W_{\frac{1}{3}})O_3$ (specimen No.1, y=0.25), the specific dielectric constant of the ternary composition is increased by incorporating thereto about not more than 35 mol % of $Pb(Fe_{\frac{1}{2}}Ta_{\frac{1}{2}})O_3$ as the third ingredient. x is preferably from 0.01 to 0.3 and, most preferably, 0.05. It can further been seen from FIGS. 2 and 7 that the increasing tendency of the specific dielectric constant with the incorporation of the third ingredient is also dependent on y. y is preferably from 0.17 to 0.4, more preferably, from 0.2 to 0.35 and, most preferably, 0.25. After all, the specific dielectric constant is at the maximum value of 17,000 when x is 0.05 and y is 0.25.

As shown in FIGS. 3–6, in the case where the ternary composition is expressed as $(1-x)\{(1-y)Pb(Fe_{\frac{1}{2}}Nb-$ $_{\frac{1}{3}})O_3 - yPb(Fe_{\frac{2}{3}}W_{\frac{1}{3}})O_3\} - xPb(Fe_{\frac{1}{2}}Ta_{\frac{1}{2}})O_3$, the relation of x to y is as described below.

Figure 3:
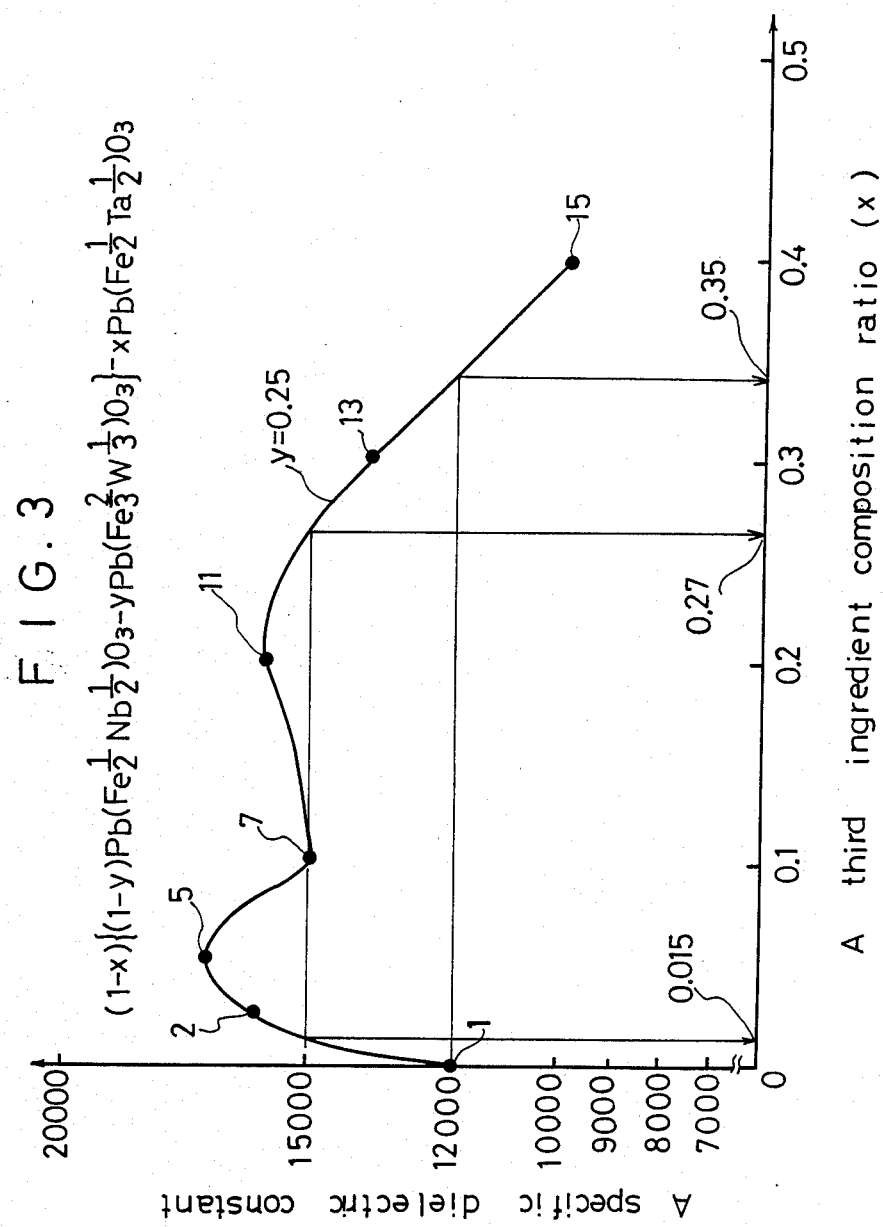
FIG. 3 is a graph showing the characteristics of the specific dielectric constant of the ternary composition in the case where y is 0.25 as shown in FIG. 2.
Figure 4:
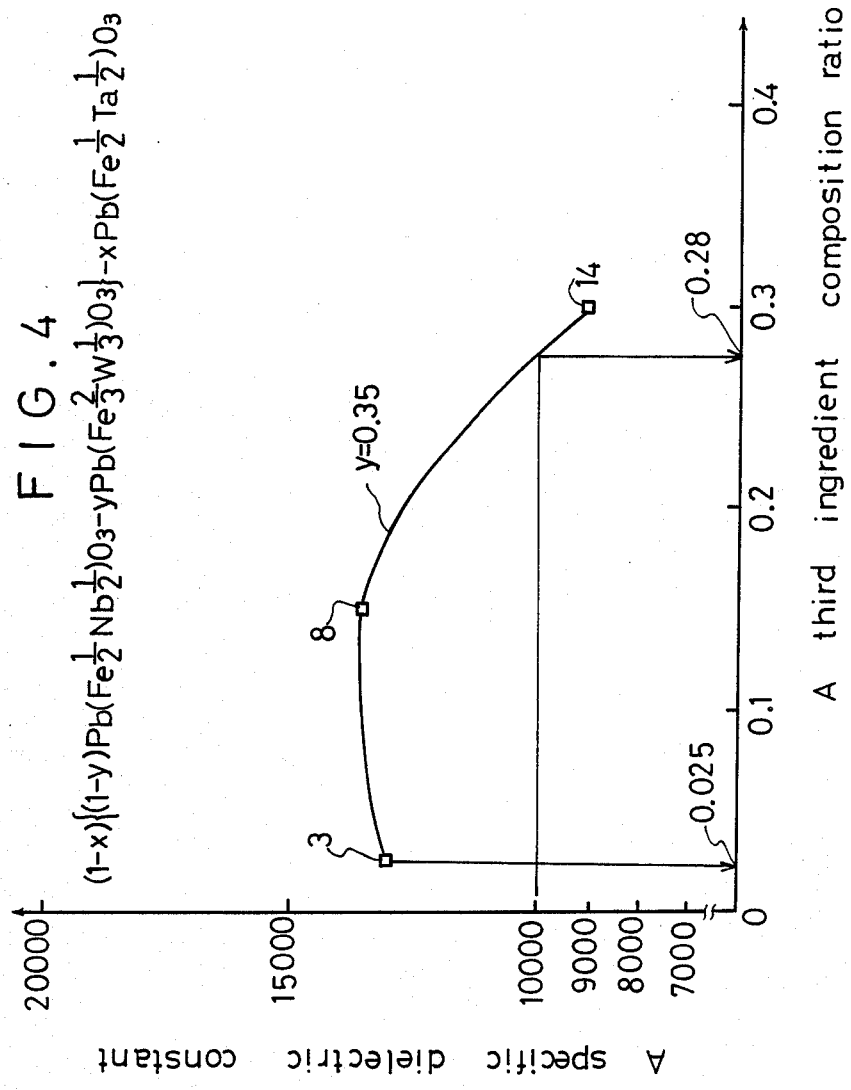
FIG. 4 is a graph showing the characteristics of the specific dielectric constant for the ternary composition when y is 0.35 as shown in FIG. 2.
Figure 5:
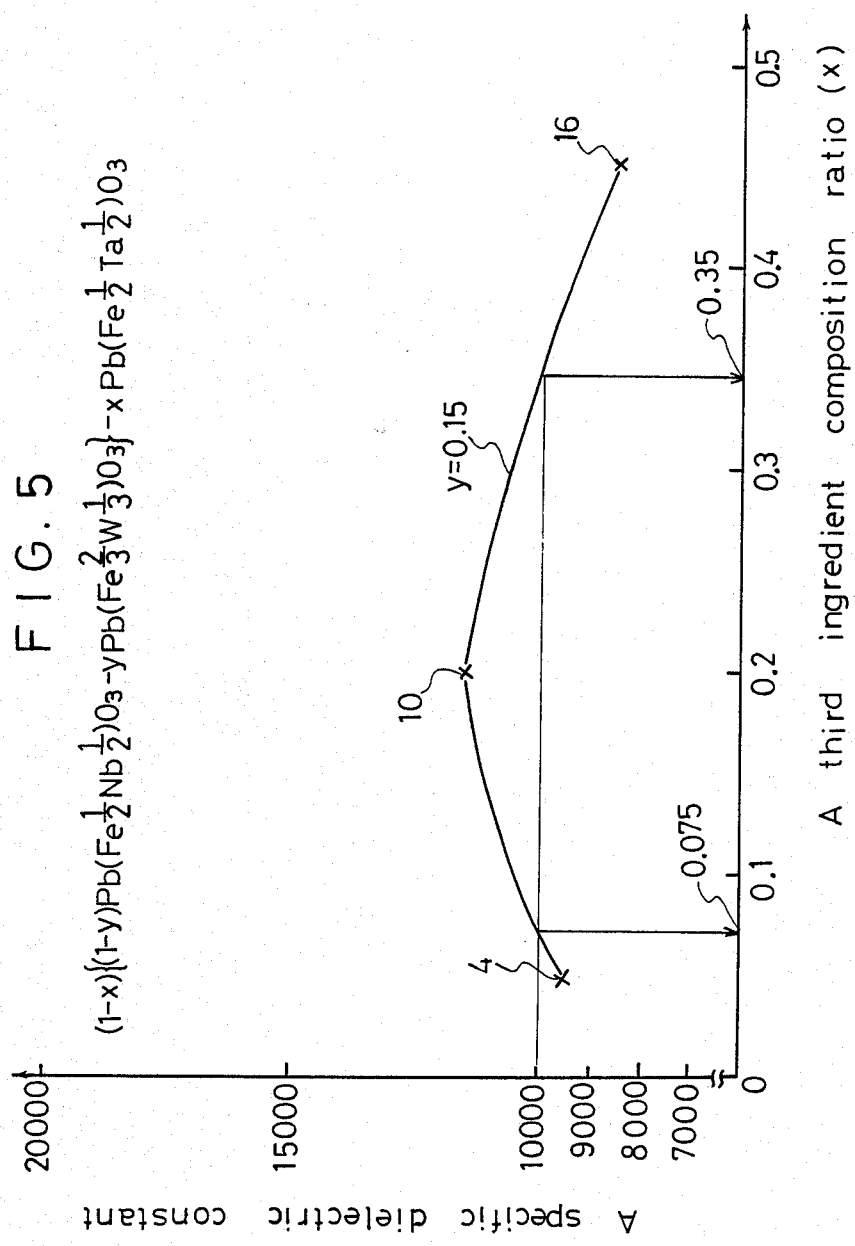
FIG. 5 is a graph showing the characteristics of the specific dielectric constant for the ternary composition when y is 0.15 as shown in FIG. 2.
Figure 6:
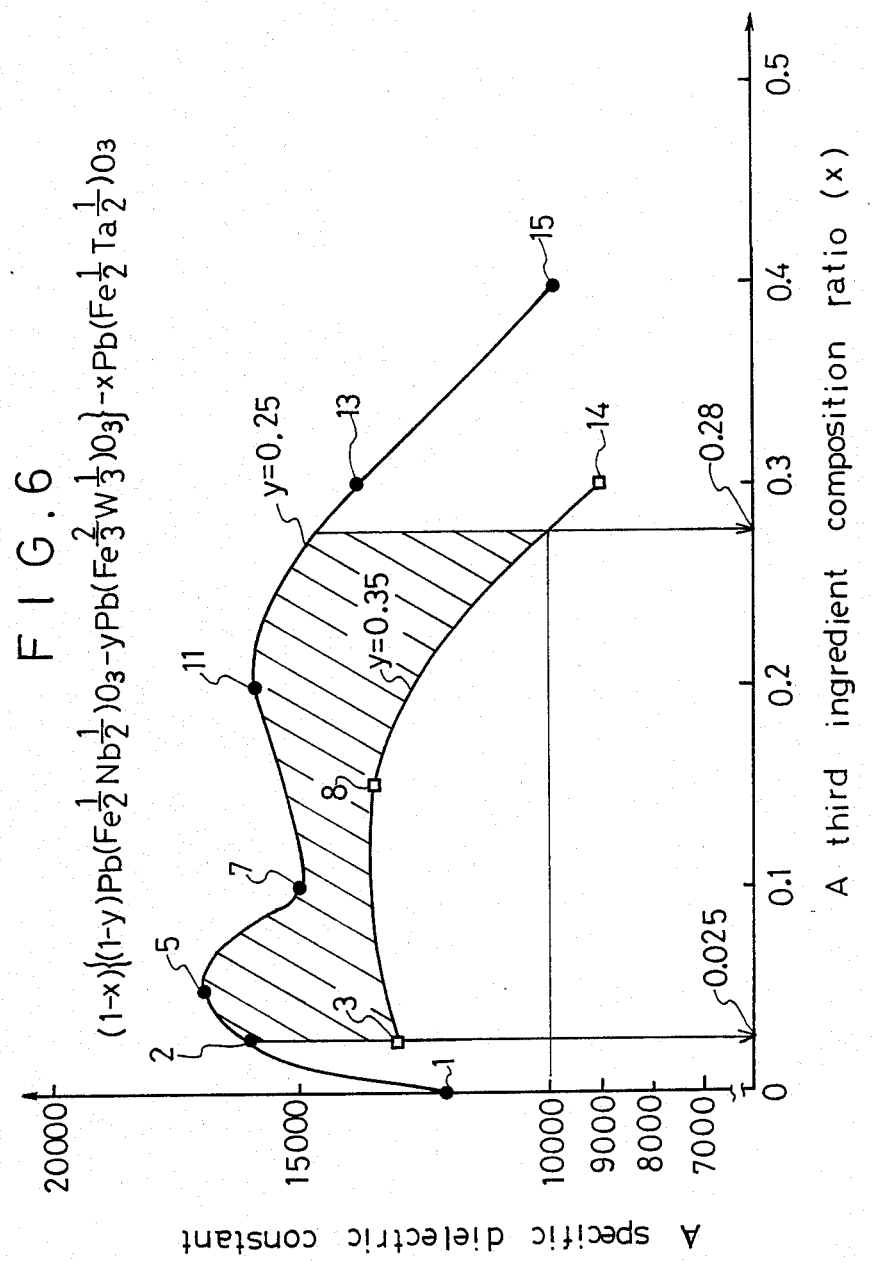
FIG. 6 is a graph showing the characteristics of the specific dielectric constant for the ternary composition when y is 0.25 and 0.35 as shown in FIG. 2.

As shown in FIG. 3, when x is more than zero and not more than 0.35 at y=0.25, the specific dielectric constant is not less than about 12,000 and, particularly, when x is from 0.015 to 0.27, the specific dielectric constant takes an extremely large value of not less than about 15,000. As shown in FIG. 4, when x is from 0.25 to 0.28 at y=0.35, the specific dielectric constant is not less than about 10,000. As shown in FIG. 5, in a case where x is from 0.075 to 0.35 at y=0.15, the specific dielectric constant is not less than about 10,000. Further, as shown in FIG. 6, in a case where x is from 0.025 to 0.28 and y is from 0.25 to 0.35, the specific dielectric constant may be not less than about 10,000.

Further, as shown in FIGS. 8–11, in a case where the ternary composition is expressed in the same composition scheme as described above, y has a relationship to x as described below.

Figure 8:
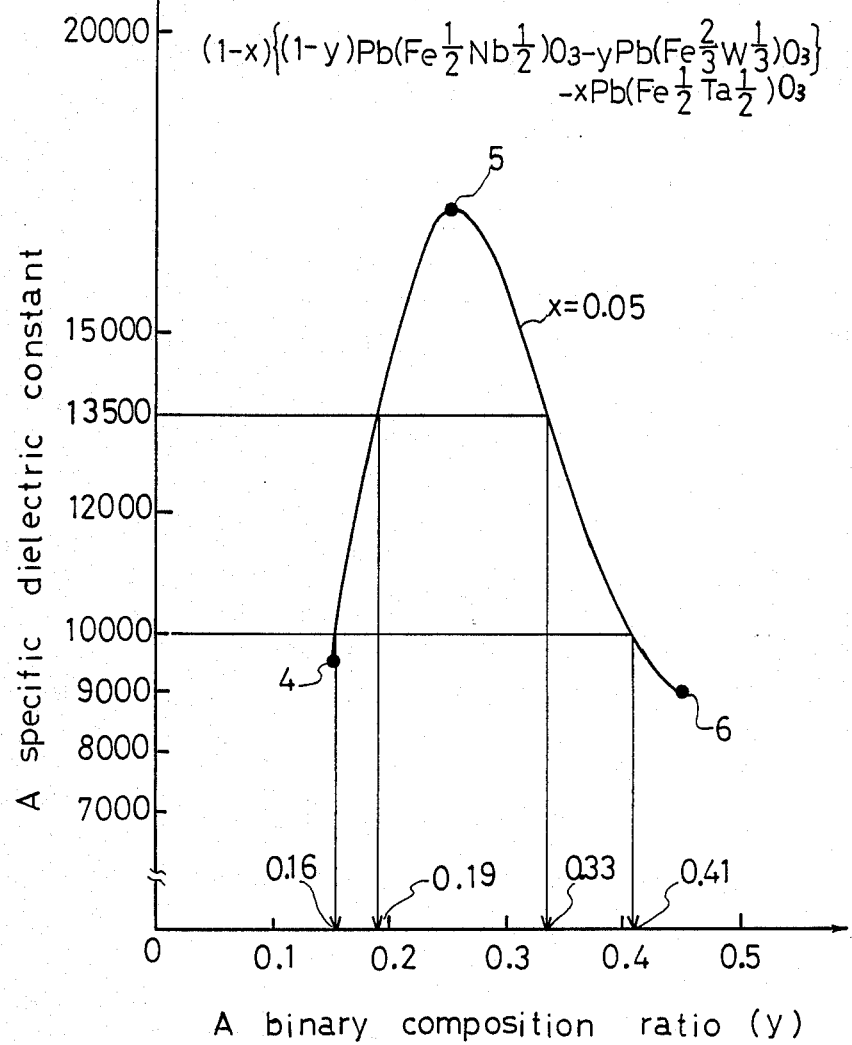
FIG. 8 is a graph showing the characteristics of the specific dielectric constant of the ternary composition when x is 0.05 as shown in FIG. 7.
Figure 9:
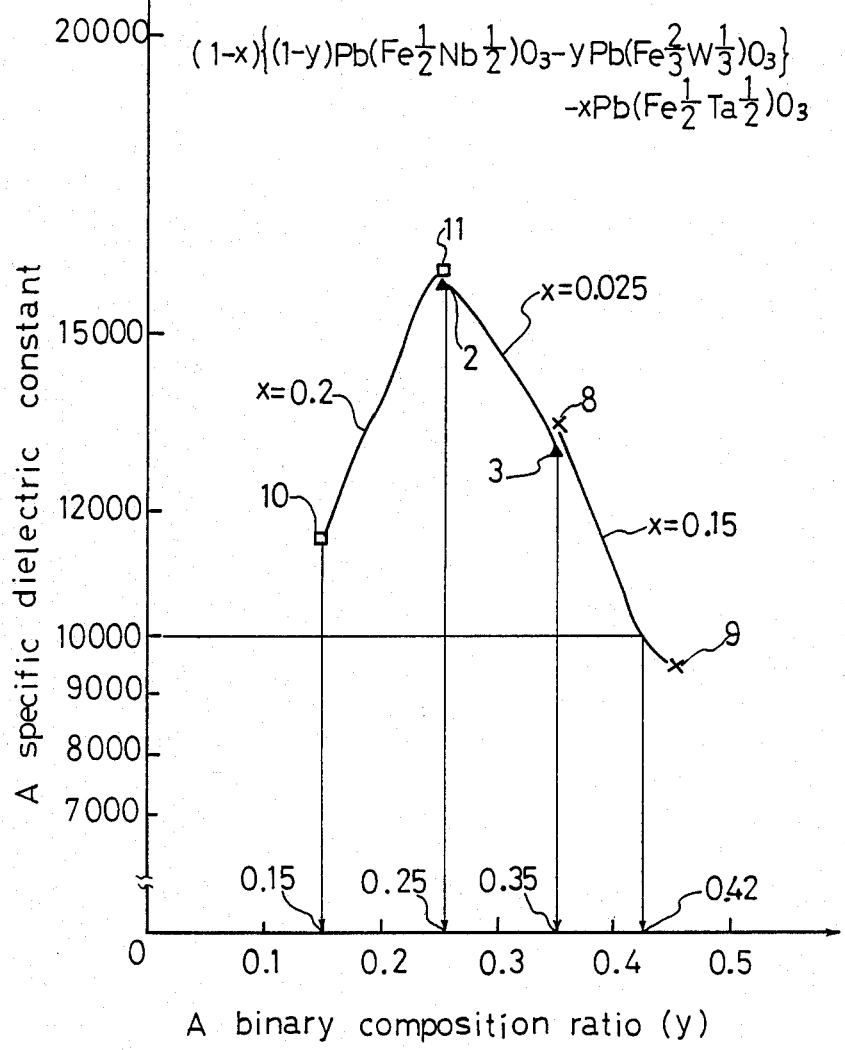
FIG. 9 is a graph showing the characteristics of the specific constant of the ternary composition when x is 0.025, 0.15 and 0.2 as shown in FIG. 7.
Figure 10:
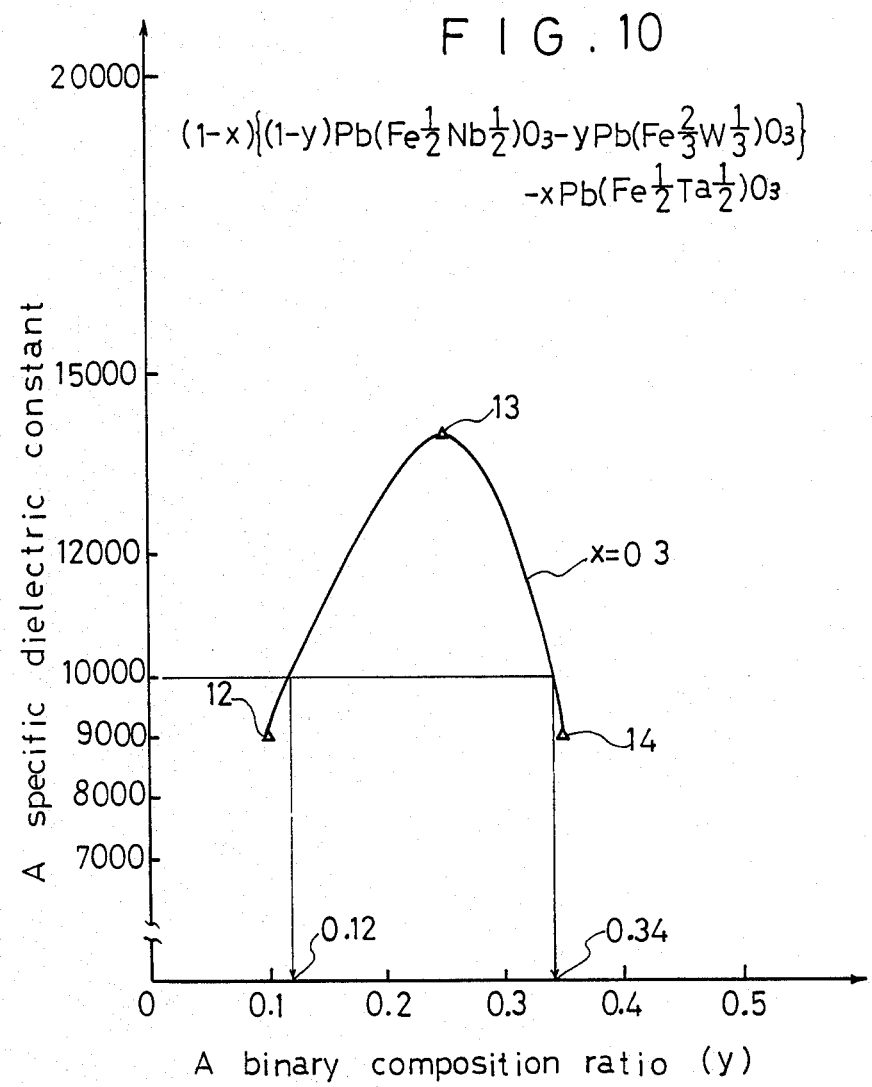
FIG. 10 is a graph showing the characteristics of the specific dielectric constant of the ternary composition when x is 0.3 as shown in FIG. 7.
Figure 11:
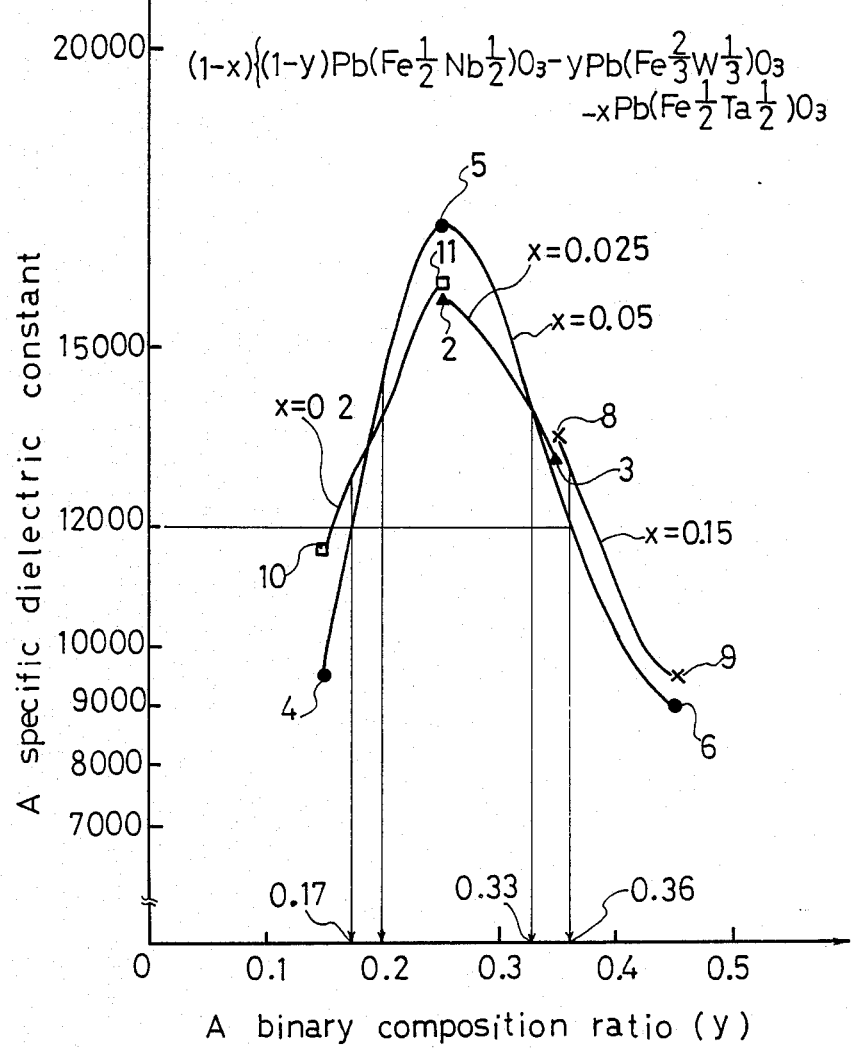
FIG. 11 is a graph showing the characteristics of the specific dielectric constant of the ternary composition when x is 0.025, 0.05, 0.15 and 0.2 as shown in FIG. 7.

Specifically, as shown in FIG. 8, when y is from 0.16 to 0.41 at x=0.05, the specific dielectric constant is not less than about 10,000 and, particularly, when y is from 0.19 to 0.33, the specific dielectric constant shows an extremely high value as large as not less than about 13,500. As shown in FIG. 9, in a case where y is from 0.25 to 0.35 at x=0.025, the specific dielectric constant is from 13,000 to 16,000. In a case where y is from 0.35 to 0.42 at x=0.15, the specific dielectric constant is from about 10,000 to 13,500. In a case where y is from 0.15 to 0.25 at x=0.2, the specific dielectric constant is from 11,500 to 16,000. As shown in FIG. 10, in a case where y is from 0.12 to 0.34 at x=0.3, the specific dielectric constant is from about 10,000 to 14,000. Further, as shown in FIG. 11, in a case where x is from 0.025 to 0.2 and y is from 0.17 to 0.36, the specific dielectric constant may be not less than about 12,000 and, particularly, in a case where x is from 0.025 to 0.05 and y is from 0.2 to 0.33, the specific dielectric constant may be extremely large as from about 13,500 to 17,000.

The reason for the improvement is the specific dielectric constant by the incorporation of the third ingredient can be considered as below.

That is, it can be considered that the dielectric dispersion is low at not more than 1 MHz and the attenuation in the specific dielectric constant is low and that the absolute value for the specific dielectric constant has been improved. Further, as can be seen in FIG. 12, it has a higher specific constant than that of the binary composition also within a range from 1 MHz to 100 MHz (the dielectric constant is approximately the same at a frequency region of higher than 100 MHz). Further, since the attenuation amount is the specific dielectric constant is larger in the ternary composition at the frequency region of higher than 1 MHz, the dielectric loss is larger and, accordingly, the heat loss at high frequency is also larger in the frequency region of higher than 1 MHz.

Those compositions included within the quadrangle A-B-C-D (including the boundary line) in the ternary phase diagram in FIG. 1 are particularly satisfactory having a high specific dielectric constant of not less than 13,000 in such a high frequency region. Further, if the ratio is out of the range of claim 1, the specific dielectric constant at 1 MHz is reduced and it is not suitable as the high frequency wave absorbing material.

Figure 13:
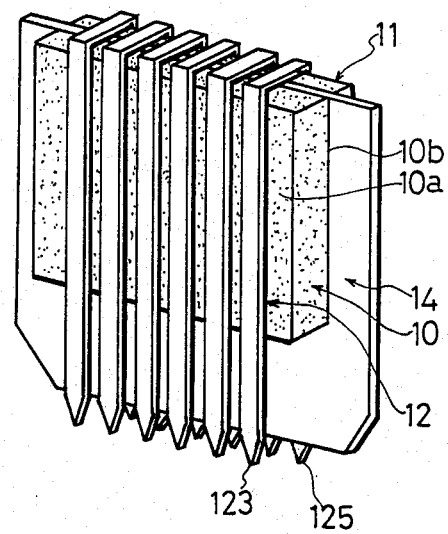
FIG. 13 is a perspective view showing the structure of a high frequency cut-off filter according to the first application example using the material of this invention.

Then, an application example of a high frequency cut-off filter using the material according to this invention is shown. FIG. 13 is a perspective view showing the constitution of a high frequency cut-off filter according to the one application example (a first application example).

A dielectric spacer 10 comprises the ternary composition according to this invention. An electrode is formed at one main surface 10a of the dielectric spacer 10 by printing to bake a silver paste in a rectangular form and another electrode is formed at the opposing second main surface 10b thereof by printing to bake a silver paste entirely over the end face. One end face of a grounding electrode 14 is disposed with the dielectric spacer 10 so as to be in contact with the another electrode, while the other end face is in contact with other dielectric spacer 11 of the same structure as that of the dielectric spacer 10. A plurality of U-shaped lead pins 12 are disposed so as to be in connection with the electrode formed on the first main surface of the dielectric spacers 10, 11, which constitute the signal line electrodes.

In the high frequency cut-off filter of such a constitution, signals are inputted from one terminal 123 of the lead pins 12, in which the high frequency signals are by-passed by way of the dielectric spacer 10 to the grounding electrode 14, while only the signals at low frequency are taken out from an output terminal 125 as the other terminal of the lead pins 12.

In this way, the high frequency noise component can be cut-off.

Figure 14:
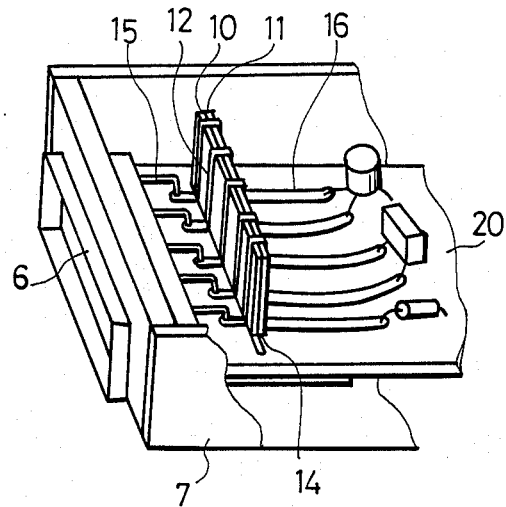
FIG. 14 is a perspective view showing the state of the high frequency cut-off filter according to the first application example disposed to the connector portion.

FIG. 14 is a perspective view showing the high frequency cut-off filter in the first application example mounted to a connector portion 6. The grounding electrode 14 is connected to a metal case 7 and each one end of the lead pins 12 is connected to a signal line 15, while each of the other ends is connected to a signal line 16 on a circuit board 20 of the electronic device. In this way, the high frequency cut-off filter can be incorporated into a connector portion of electronic equipments.

Figure 15:
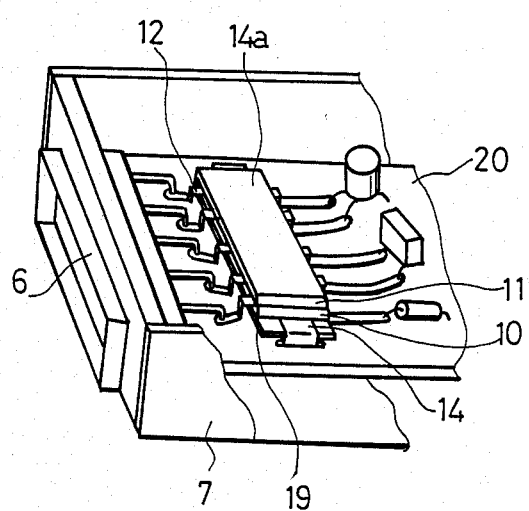
FIG. 15 is a perspective view showing the state of the high frequency cut-off filter according to the second application example disposed to the connector portion.

FIG. 15 is a perspective view where a high frequency cut-off filter according to another application example (a second application example) is disposed to the connector portion 6. The signal line electrode 12 is put between the dielectric spacers 10 and 11. The lower surface of the dielectric spacer 10 is in contact with the grounding electrode 14. The grounding electrode 14 is disposed by way of an insulator plate 19 on a circuit board 20 and further connected electrically to a metal casing 7. Further, a grounding electrode 14a is formed also on the upper surface of the dielectric spacer 11, which is connected electrically to the metal case 7 in the same manner as described above.

In this way, the signal line electrode is sandwitched between a plurality of dielectric spacers to constitute a parallel capacitor form.

Figure 16:
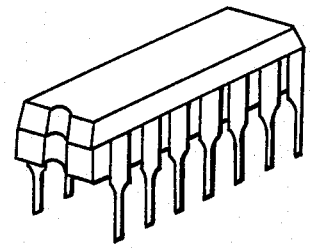
FIG. 16 is a perspective outer view for the high frequency cut-off filter according to another modification embodiment.

Further, it is also possible to apply resin potting the filters of these application examples to constitute as shown in FIG. 16.

What is claimed is:

1. A high frequency wave absorbing ceramics of a ternary composition comprising lead iron niobate $Pb(Fe_{\frac{1}{2}}Nb_{\frac{1}{2}})O_3$, lead iron tungstate $Pb(Fe_{\frac{2}{3}}W_{\frac{1}{3}})O_3$ and lead iron tantalate $Pb(Fe_{\frac{1}{2}}Ta_{\frac{1}{2}})O_3$, the composition ratio in the ternary composition lying in the inside (including the boundary) of a quadrangle A-B-C-D in the ternary phase diagram shown in FIG. 1, and the high frequency wave absorbing ceramics having a dielectric constant of 13000 or more at a frequency of 1 MHz.

2. The high frequency wave absorbing ceramics according to claim 1, wherein the ternary composition is expressed as $(1-x)(1-y)Pb(Fe_{\frac{1}{2}}Nb_{\frac{1}{2}})O_3$ $(1-x)yPb(Fe_{\frac{2}{3}}W_{\frac{1}{3}})O_3$ OHYA et al, Ser. No. 07/125,711 $xPb(Fe_{\frac{1}{2}}Ta_{\frac{1}{2}})O_3$ in which y is from 0.25 to 0.33 when x is 0.05 in the above equation.

3. The high frequency wave absorbing ceramics according to claim 1, wherein the ternary composition is expressed as $(1-x)(1-y)Pb(Fe_{\frac{1}{2}}Nb_{\frac{1}{2}})O_3$ $(1-x)yPb(Fe_{\frac{2}{3}}W_{\frac{1}{3}})O_3$ $xPb(Fe_{\frac{1}{2}}Ta_{\frac{1}{2}})O_3$ in which y is from 0.18 to 0.25 when x is from 0.025 to 0.05 in the above equation.

4. The high frequency wave absorbing ceramics according to claim 1, wherein the ternary composition is expressed as $(1-x)(1-y)Pb(Fe_{\frac{1}{2}}Nb_{\frac{1}{2}})O_3$ $(1-x)yPb(Fe_{\frac{2}{3}}W_{\frac{1}{3}})O_3$ $xPb(Fe_{\frac{1}{2}}Ta_{\frac{1}{2}})O_3$ in which x is from 0.025 to 0.27 when y is 0.25 in the above equation.

5. A high frequency wave absorbing ceramics of a ternary composition consisting essentially of lead iron niobate $Pb(Fe_{\frac{1}{2}}Nb_{\frac{1}{2}})O_3$ lead iron tungstate $Pb(Fe_{\frac{2}{3}}W_{\frac{1}{3}})O_3$ and lead iron tantalate $Pb(Fe_{\frac{1}{2}}Ta_{\frac{1}{2}})O_3$ the composition ratio in the ternary composition lying in the inside (including the boundary) of a quadrangle A-B-C-D in the ternary phase diagram shown in FIG. 1, and the high frequency wave absorbing ceramics having a dielectric constant of 13000 or more at a frequency of 1 MHz.

6. The high frequency wave absorbing ceramics according to claim 1, which is prepared by mixing:

a powder of lead iron niobate $Pb(Fe_{\frac{1}{2}}Nb_{\frac{1}{2}})O_3$ comprising 4 mol of lead oxide powder (PbO), 1 mol of iron oxide powder ($Fe_2O_3$) and 1 mol of niobium oxide ($Nb_2O_5$), a powder of lead iron tungstate $Pb(Fe_{\frac{2}{3}}W_{\frac{1}{3}})O_3$ comprising 3 mol of lead oxide powder (PbO), 1 mol of iron oxide powder ($Fe_2O_3$) and 1 mol of tungsten oxide ($WO_3$) and a powder of lead iron tantalate $Pb(Fe_{\frac{1}{2}}Ta_{\frac{1}{2}})O_3$ comprising 4 mol of lead oxide powder (PbO), 1 mol of tantalum oxide powder ($Ta_2O_5$) and 1 mol of iron oxide ($Fe_2O_3$), molding the mixture and then sintering the molded mixture at a temperature of from 1,000° to 1,150° C.

* * * * *

UNITED STATES PATENT AND TRADEMARK OFFICE
CERTIFICATE OF CORRECTION

PATENT NO.   : 4,829,030
DATED        : May 9, 1989
INVENTOR(S)  : OHYA, et al.

It is certified that error appears in the above-identified patent and that said Letters Patent is hereby corrected as shown below:

Col. 2, line 47, before "Pb" (first occurrence) delete "("
Col. 4, line 3, change "No.-No.16" to -- No.1-No.16 --.
Col. 7, line 4, delete "OHYA et al, Ser. No. 07/125,711"

Signed and Sealed this

Tenth Day of September, 1991

Attest:

HARRY F. MANBECK, JR.

Attesting Officer

Commissioner of Patents and Trademarks